United States Patent
Kashi et al.

(10) Patent No.: US 10,689,025 B2
(45) Date of Patent: Jun. 23, 2020

(54) STEERING DEVICE AND METHOD OF CONTROLLING A STEERING DEVICE

(71) Applicant: TRW Automotive GmbH, Alfdorf (DE)

(72) Inventors: Keiwan Kashi, Duesseldorf (DE); Catharina Burdessa, Essen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 354 days.

(21) Appl. No.: 15/526,373

(22) PCT Filed: Oct. 21, 2015

(86) PCT No.: PCT/EP2015/074371
§ 371 (c)(1),
(2) Date: May 12, 2017

(87) PCT Pub. No.: WO2016/087118
PCT Pub. Date: Jun. 9, 2016

(65) Prior Publication Data
US 2017/0320516 A1    Nov. 9, 2017

(30) Foreign Application Priority Data
Dec. 2, 2014 (DE) .................. 10 2014 117 718

(51) Int. Cl.
*B62D 5/04* (2006.01)
*B62D 15/02* (2006.01)
*B62D 6/00* (2006.01)

(52) U.S. Cl.
CPC ........... *B62D 5/0466* (2013.01); *B62D 6/008* (2013.01); *B62D 15/021* (2013.01)

(58) Field of Classification Search
CPC ..... B62D 5/0466; B62D 6/008; B62D 15/021
(Continued)

(56) References Cited

U.S. PATENT DOCUMENTS 3,456,752 A * 7/1969 Fonda ................ B62D 5/06
 180/421
3,600,660 A * 8/1971 Ford ................ G01B 7/008
 318/578
(Continued)

FOREIGN PATENT DOCUMENTS

CN  2747128 Y  12/2005
CN  1891552 A   1/2007
(Continued)

OTHER PUBLICATIONS

PCT International Search Report and the Written Opinion, Application No. PCT/EP2015/074371, dated Jan. 28, 2016.
(Continued)

*Primary Examiner* — Anne Marie Antonucci
(74) *Attorney, Agent, or Firm* — MacMillan, Sobanski & Todd, LLC

(57) ABSTRACT

A steering device for a motor vehicle is described, the steering device comprising a steering element for steering the motor vehicle, and an actuating element by means of which wheels of the motor vehicle are adjusted as a function of an actuation of the steering element. The steering element has a steering assist unit associated with it, in particular an electronic steering assist unit for active return of the steering element, the steering assist unit comprising a motor and an open- and closed-loop control unit which drives the motor for generating an assist torque. The open- and closed-loop control unit receives data from a first sensor which directly senses the position of the actuating element, and drives the motor as a function of the position of the actuating element. Further described is a method of controlling a steering device.

16 Claims, 2 Drawing Sheets

(58) Field of Classification Search
USPC .......................................................... 701/41
See application file for complete search history.

(56) References Cited

U.S. PATENT DOCUMENTS

| | | | |
|---|---|---|---|
| 6,082,482 | A | 7/2000 | Kato et al. |
| 6,474,436 | B1 | 11/2002 | Konigorski |
| 7,181,325 | B2 | 2/2007 | Niessen et al. |
| 7,845,459 | B2 | 12/2010 | Kasai |
| 8,249,777 | B2 | 8/2012 | Greul et al. |
| 9,989,384 | B2 | 6/2018 | Scotson |
| 2014/0156144 | A1 | 6/2014 | Hoshi et al. |
| 2017/0320516 | A1* | 11/2017 | Kashi .................. B62D 5/0466 |

FOREIGN PATENT DOCUMENTS

| | | |
|---|---|---|
| CN | 101472779 A | 7/2009 |
| CN | 103703377 A | 4/2014 |
| DE | 19806458 A1 | 8/1998 |
| DE | 19833189 A1 | 1/2000 |
| DE | 10052559 A1 | 4/2002 |
| DE | 10208673 A1 | 9/2003 |
| DE | 102007040064 A1 | 2/2009 |
| DE | 102009000638 A1 | 8/2010 |
| JP | 2004196043 A | 7/2004 |
| JP | 2004291854 A | 10/2004 |

OTHER PUBLICATIONS

German Search Report, Application No. DE 102014117718.5 dated Jul. 3, 2015.

* cited by examiner

STEERING DEVICE AND METHOD OF CONTROLLING A STEERING DEVICE

CROSS-REFERENCE TO RELATED APPLICATIONS

This application is a national stage of International Application No. PCT/EP2015/074371 filed 21 Oct. 2015, the disclosures of which are incorporated herein by reference in entirety, and which claimed priority to German Patent Application No. 10 2014 117 718.5 filed 2 Dec. 2014, the disclosures of which are incorporated herein by reference in entirety.

BACKGROUND OF THE INVENTION

The invention relates to a steering device for a motor vehicle and a method of controlling a steering device.

Modern steering devices of a motor vehicle are nowadays typically assisted electronically, so that the steering torque applied by the driver of the motor vehicle is amplified by an electronic steering assist unit. In this way, the driver will perceive the process of steering the motor vehicle to be generally more comfortable. Also, the steering assist unit can generate a counter-torque so that especially at higher speeds, an increased steering torque needs to be applied by the driver for steering. This is beneficial to operational safety.

The electronic steering assist unit typically includes a transmission and an electric motor, which result in a certain friction and mass inertia of the steering device. In particular, the automatic, and also desired, return behavior of the steering device, with which the driver is familiar from steering devices that are not electronically assisted, is adversely influenced. The adverse influence is such that although the wheels do return when transitioning from a cornering to traveling straight due to the track of the vehicle, the driver will not perceive a torque associated with the return of the wheels at the steering element.

In the prior art, the return behavior is actively provided by the electronic steering assist unit by an appropriate assist torque being generated for the return motion. To this end, the electronic steering assist unit includes an open- and closed-loop control unit which detects the steering angle, the steering wheel angular velocity and the vehicle speed by means of sensors and drives the electric motor accordingly, so that, by way of the assist torque generated, the driver is given the impression that the steering element returns automatically.

However, it has turned out to be a disadvantage here that influencing factors for the respective vehicle topology still have to be taken into consideration and compensated in a time-consuming manner since the steering angle and the steering wheel angular velocity are detected at the steering shaft, which, depending on the vehicle type, have different transmission ratios in relation to the wheels. Further influencing factors include, for example, the steering axis inclination, the caster and the steering offset of the steering axle geometry.

BRIEF SUMMARY OF THE INVENTION

It is a feature of the invention to provide a steering device and a method which allow an active return motion of the steering device, irrespective of the vehicle topology.

The feature of the invention is achieved by a steering device for a motor vehicle, the steering device comprising a steering element for steering the motor vehicle and an actuating element by means of which wheels of the motor vehicle are adjusted as a function of an actuation of the steering element, the steering element having a steering assist unit associated with it, in particular an electronic steering assist unit for active return of the steering element, the steering assist unit comprising a motor and an open- and closed-loop control unit which drives the motor for generating an assist torque, the open- and closed-loop control unit receiving data from a first sensor which directly senses the position of the actuating element, and driving the motor as a function of the position of the actuating element.

The feature of the invention is furthermore achieved by a method of controlling a steering device, in particular a steering device of the type previously mentioned, wherein an open- and closed-loop control unit senses the position of an actuating element by means of a first sensor, and the open- and closed-loop control unit calculates an assist torque of a motor for returning a steering element as a function of the position of the actuating element.

The basic idea of the invention is that the open- and closed-loop control unit drives the motor directly as a function of the position of the actuating element, so that transmission ratios between the steering element and the actuating element, as well as elasticities and manufacturing tolerances between the steering element and the actuating element may be left out of consideration. Generally, for driving the motor a controlled variable is used which captures the positions of the wheels directly since the sensor detects the position of the actuating element, which is directly coupled to the wheels. The steering device according to the invention allows an active return of the steering element independently of the vehicle topology and the arrangement of the steering device. By analogy with the configuration of the steering device, the method allows the assist torque of the motor for returning the steering element to be calculated independently of the vehicle topology since the position of the actuating element is directly detected as the controlled variable. Therefore, according to the invention, it is exactly not the steering angle and/or the steering wheel angular velocity of the steering element that is/are detected by a sensor in order to calculate the assist torque of the motor for returning the steering element, as is done in the prior art. In fact, a calculation on the basis of the steering angle and/or the steering wheel angular velocity is dependent on the vehicle topology and the arrangement of the steering device, and is thus not universal.

A further aspect of the invention provides that the open- and closed-loop control unit receives data from a second sensor which senses the velocity of the actuating element, the first and second sensors more particularly being adapted to be configured in a sensor unit.

Regarding the method, the velocity of the actuating element is sensed by the second sensor, which transmits this value to the open- and closed-loop control unit, which uses the sensed value to calculate the assist torque of the motor.

The second sensor provides data for calculating the assist torque, such data capturing the present driving situation even more precisely since the velocity of the actuating element during the transition to its neutral position is measured additionally. This data is also independent of the construction of the vehicle or the transmission ratio of the steering element in relation to the actuating element. Since both sensors sense conditions of the actuating element, they may be configured in one single sensor unit in a space-saving manner.

In particular, the open- and closed-loop control unit receives data from a third sensor which senses the speed of the motor vehicle.

In the method, the vehicle speed sensed by the third sensor is transmitted to the open- and closed-loop control unit, which uses the sensed value to calculate the assist torque of the motor.

The speed of the motor vehicle serves as a further controlled variable since the driver's sensation or perception is generally dependent on the vehicle speed, which constitutes an important parameter with regard to the operational safety of the motor vehicle. Further, the speed of the motor vehicle has an influence on the return of the wheels from cornering to the neutral position of the wheels since the speed has an influence on the frictional force between the road surface and the wheels and, hence, the return force thereof.

According to a further aspect of the invention, the open- and closed-loop control unit includes a reference generator which calculates a reference velocity of the actuating element, in particular as a function of the incoming sensor signals.

In the method, a reference velocity of the actuating element is generated in the reference generator of the open- and closed-loop control unit on the basis of the values sensed by the sensors.

The reference velocity indicates the velocity at which the actuating element is to move to its neutral position, the actual velocity of the actuating element and the vehicle speed being included here, among others. Accordingly, the reference velocity of the actuating element is calculated based on parameters that are independent of the respective vehicle topology. In addition, the open- and closed-loop control unit can continuously compare the current velocity of the actuating element with the reference velocity and adjust the assist torque appropriately.

A further aspect of the invention provides that the open- and closed-loop control unit comprises a calculating unit, a limiting unit, and a damping unit which receives data from at least one sensor on the steering element. Generally, a safe driving operation can be ensured by means of the additional units.

In the method, a damping factor may be calculated in a damping unit of the open- and closed-loop control unit, in particular as a function of the position, the speed and the torque of the steering element. The damping factor thus depends on the activity of the driver and damps the assist torque to be provided by the motor of the electronic steering assist unit in accordance with the present driving situation, so that the driver will not be taken by surprise.

A further aspect of the method provides that a maximum assist torque of the motor is calculated in a limiting unit of the open- and closed-loop control unit, in particular as a function of the damping factor determined by the damping unit and of the motor vehicle speed. This makes sure that the assist torque made available is within a range that ensures safe operation of the vehicle at all times.

The steering device may be an electrically powered or electrically assisted steering device, in particular a steer-by-wire steering device. Especially in the case of steering devices of this type it is common practice to provide electronic steering assist units. Depending to the steering device, the motor may also double as the motor that adjusts the actuating element.

Other advantages of this invention will become apparent to those skilled in the art from the following detailed description of the preferred embodiments, when read in light of the accompanying drawings.

DETAILED DESCRIPTION OF THE INVENTION

Figure 1:
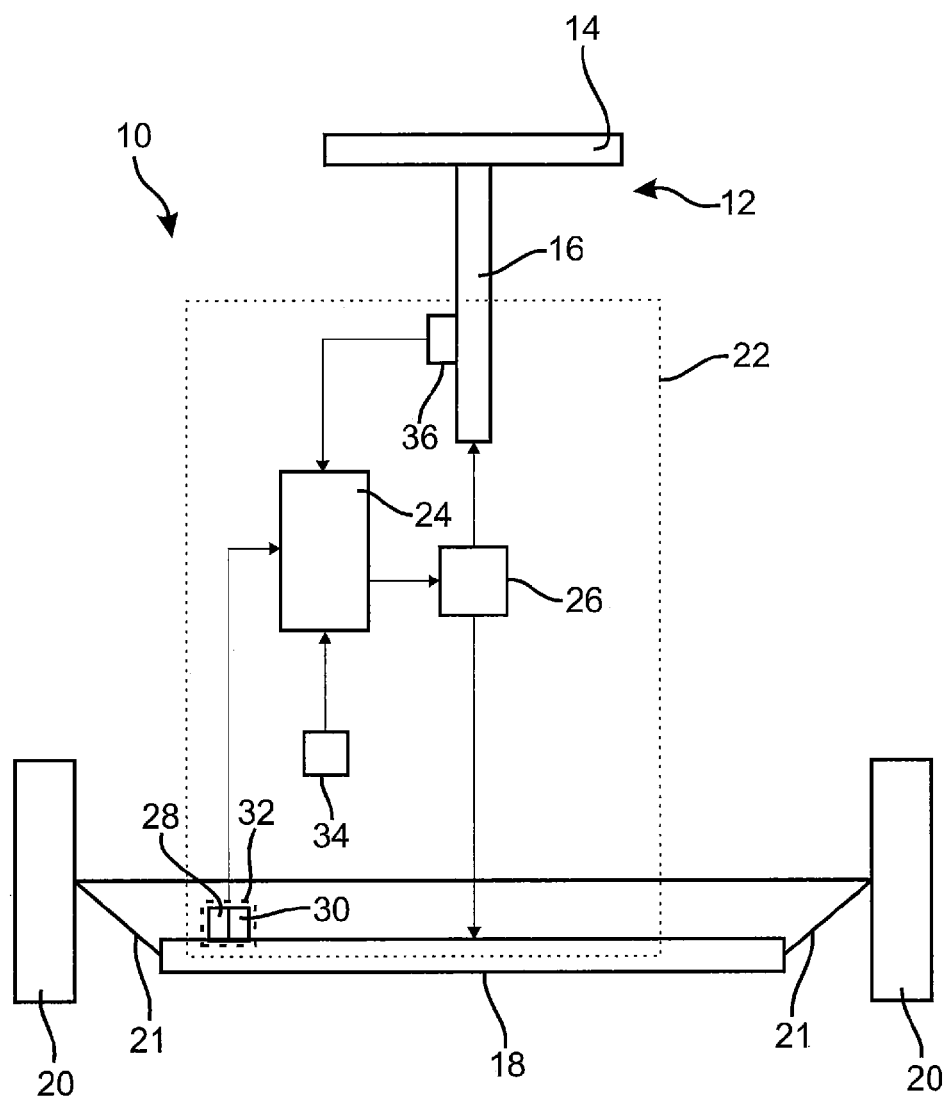
FIG. 1 shows a schematic representation of a steering device according to the invention.

FIG. 1 schematically illustrates a steering device 10 for a motor vehicle, the steering device comprising a steering element 12, which includes a steering wheel 14 and a steering shaft 16 arranged thereon, and an actuating element 18 which has a pair of wheels 20 of the motor vehicle directly coupled thereto by means of track rod arms 21. Depending on the design of the steering device 10, steering arms and steering knuckles may also be provided.

An electronic steering assist unit 22, which may generally be configured to assist the steering device 10, is arranged between the steering element 12 and the actuating element 18. This may include an active adjustment of the actuating element 18 and a generation of torques in the steering element 12 to create an improved perception on the part of the driver. The electronic steering assist unit 22 may, in addition, actively return the steering element 12 when the vehicle transitions from a cornering to traveling straight.

FIG. 1 only shows those components of the electronic steering assist unit 22 which are necessary for the active return of the steering element 12 to its neutral position.

Thus, the electronic steering assist unit 22 includes an open- and closed-loop control unit 24 which, as the central element of the steering assist unit 22, drives an electric motor 26 which actively returns the steering element 12 to its neutral position.

The open- and closed-loop control unit 24 receives data from a first sensor 28 which senses the position of the actuating element 18, and from a second sensor 30 which senses the velocity of the actuating element 18. The two sensors 28, 30 may be embodied in one single sensor unit 32 here, so that they are realized in a space-saving manner.

The open- and closed-loop control unit 24 further receives data from a third sensor 34 which senses the vehicle speed.

In addition, the open- and closed-loop control unit 24 may acquire data from a further sensor 36 which is arranged on the steering element 12, in particular on the steering shaft 16, and transmits data such as the angular position of the steering shaft, the rotational velocity of the steering shaft, and the steering shaft torque to the open- and closed-loop control unit 24.

Using the three sensors 28, 30, 34, the open- and closed-loop control unit 24 can calculate an assist torque of the motor 26, which acts on the steering element 12 so as to give the driver the impression of an active return of the steering element 12 to the neutral position as is known from steering devices that are not electronically assisted.

The data sensed by the further sensor 36 furthermore serves for a kind of fine adjustment of the assist torque of the motor 26.

The mode of operation of the steering device 10, and in particular the control of the steering assist unit 22 are described with reference to FIG. 2.

Figure 2:
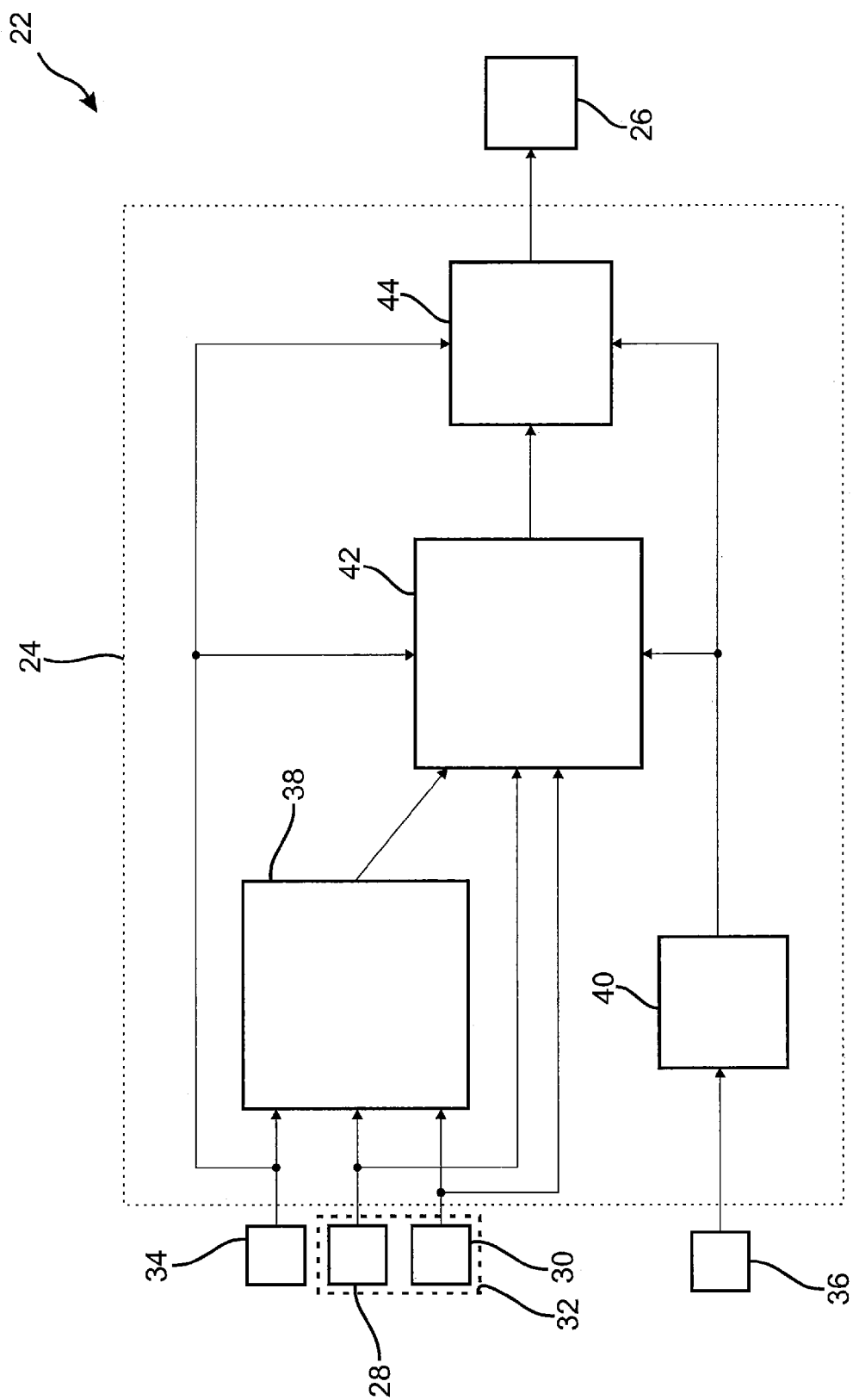
FIG. 2 shows a schematic representation for illustrating the method according to the invention for controlling a steering device.

FIG. 2 schematically illustrates how the data received from the individual sensors 28, 30, 34, 36 are processed in the open- and closed-loop control unit 24 of the electronic steering assist unit 22 in order to drive the motor 26 of the electronic steering assist unit 22 such that a particular assist torque is generated by the motor 26, as a result of which the steering element 12 is actively returned.

To this end, the open- and closed-loop control unit 24 includes a reference generator 38, a damping unit 40, a calculating unit 42, and a limiting unit 44, each of which receives data from the different sensors 28, 30, 34, 36 and processes it as described below.

Based on the sensor signals of the first three sensors 28, 30, 34, the reference generator 38 generates a reference velocity of the actuating element 18, at which the actuating element 18 is to move back to its neutral position. The reference generator 38 transmits this reference velocity to the calculating unit 42.

Additionally, the calculating unit 42 receives the respectively measured data directly from the sensors 28, 30, 34. Accordingly, the calculating unit 42 receives the reference velocity of the actuating element 18 as generated by the reference generator 38, the vehicle speed sensed by the third sensor 34, the actual velocity of the actuating element 18 as sensed by the second sensor 30, and the position of the actuating element 18 as sensed by the first sensor 28.

Furthermore, the calculating unit 42 receives a damping factor which has been calculated in the damping unit 40 as a function of the data sensed by the further sensor 36. The damping factor here is a variable from which conclusions are drawn to the activity of the driver since the data sensed by the further sensor 36 are measured directly at the steering element 12, which is operated by the driver. By means of the damping factor, the assist torque to be generated by the motor 26 can be adapted to the activity of the driver.

On the basis of the data previously mentioned, a preliminary assist torque of the motor 26 is now calculated in the calculating unit 42. The open- and closed-loop control unit 24 can compare the reference velocity generated by the reference generator 38 with the actual velocity of the actuating element 18 here and can appropriately adjust the preliminary assist torque of the motor 26. This method step can be carried out iteratively, with an adjustment of the reference velocity calculated in the reference generator 38 also being possible.

The preliminary assist torque calculated in the calculating unit 42 can, in conclusion, be limited in the limiting unit 44. To this end, the damping factor calculated by the damping unit 40, the vehicle speed sensed by the third sensor 34 and the preliminary assist torque calculated by the calculating unit 42 are provided to the limiting unit 44.

Based on the incoming variable, the limiting unit 44 calculates a limitation of the preliminary assist torque and limits the latter in certain vehicle situations, so that it is ensured that the assist torque of the steering assist unit 22 as generated by the motor 26 will not lead to any unsafe vehicle situation. Here, in particular the vehicle speed and the behavior of the driver are taken into account.

The electric motor 26 may be a separate motor which is only provided for actively returning the steering element 12. Alternatively, the motor 26 may be that motor which also adjusts the actuating element 18 during a steering process. This depends on the type of steering device 10. For example, if a steer-by-wire steering device is involved, which has no mechanical connection between the steering element 12 and the actuating element 18, two separate motors are provided. If, on the other hand, the steering device is an electronically assisted steering device which may feature a mechanical connection, all in all, only one motor may be provided.

The steering device 10 according to the invention and the method according to the invention of controlling a steering device make sure that the assist torque of the electronic steering assist unit 22 can be determined independently of the vehicle topology, so that a safe vehicle operation and an active return of the steering element 12 are ensured.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering device for a motor vehicle, the steering device comprising a steering element for steering the motor vehicle, and an actuating element by means of which wheels of the motor vehicle are adjusted as a function of an actuation of the steering element, the steering element having a steering assist unit associated therewith for active return of the steering element, the steering assist unit comprising a motor and an open- and closed-loop control unit which drives the motor for generating an assist torque, the open- and closed- loop control unit receiving data from a first sensor which directly senses a position of the actuating element, and driving the motor as a function of the position of the actuating element, and receives data from a second sensor which directly senses a velocity of the actuating element.

2. The steering device according to claim 1, wherein the open- and closed-loop control unit receives data from a third sensor which senses a speed of the motor vehicle.

3. The steering device according to claim 2, wherein the open- and closed-loop control unit includes a reference generator which calculates a reference velocity of the actuating element.

4. The steering device according to claim 3, wherein the reference velocity of the actuating element is calculated as a function of signals from the first, second and third sensors.

5. The steering device according to claim 1, wherein the open- and closed-loop control unit comprises a calculating unit, a limiting unit, and a damping unit which receives data from at least one sensor on the steering element.

6. The steering device according to claim 1, wherein the steering device is an electrically powered or electrically assisted steering device.

7. The steering device according to claim 6, wherein the steering device is an electrically powered or electrically assisted steer-by-wire steering device.

8. A method of controlling a steering device according to claim 1, wherein:
 a) the open- and closed-loop control unit senses the position of an actuating element by means of the first sensor, and
 b) the open- and closed-loop control unit calculates an assist torque of the motor for returning the steering element as a function of the position of the actuating element,
 wherein the second sensor which directly senses the velocity of the actuating element and transmits the velocity to the open- and closed-loop control unit, then uses the velocity to calculate the assist torque of the motor.

9. The method according to claim 8, wherein a third sensor senses a vehicle speed and transmits the vehicle speed to the open- and closed-loop control unit, which uses the vehicle speed to calculate the assist torque of the motor.

10. The method according to claim 9, wherein on a basis of values sensed by the first, second and third sensors, a reference velocity of the actuating element is generated in a reference generator of the open- and closed-loop control unit.

11. The method according to claim 1, wherein a damping factor is calculated in a damping unit of the open- and closed-loop control unit.

12. The method according to claim 11, wherein the damping factor is calculated in the damping unit of the open- and closed-loop control unit as a function of the position, the speed and the torque of the steering element.

13. The method according to claim 1, wherein a maximum assist torque of the motor is calculated in a limiting unit of the open- and closed-loop control unit.

14. The method according to claim 13, wherein the maximum assist torque of the motor is calculated in the limiting unit of the open- and closed-loop control unit as a function of the damping factor determined by the damping unit and of the motor vehicle speed.

15. The steering device according to claim 1, wherein the first and second sensors are adapted to be configured in a sensor unit.

16. A method of controlling a steering device, wherein:

an open- and closed-loop control unit senses a position of an actuating element by means of a first sensor, and the open- and closed-loop control unit calculates an assist torque of a motor for returning a steering element as a function of the position of the actuating element, wherein a second sensor directly senses a velocity of the actuating element and transmits the velocity to the open- and closed-loop control unit, which uses the velocity to calculate the assist torque of the motor.

* * * * *